United States Patent [19]

Sakaguchi et al.

[11] Patent Number: 4,614,485
[45] Date of Patent: Sep. 30, 1986

[54] UNLOADER FOR A TIRE CURING MACHINE

[75] Inventors: Katsuyoshi Sakaguchi; Yukihiro Koga, both of Nagasaki, Japan

[73] Assignee: Mitsubishi Jukogyo Kabushiki Kaisha, Tokyo, Japan

[21] Appl. No.: 758,793

[22] Filed: Jul. 24, 1985

[30] Foreign Application Priority Data

Sep. 4, 1984 [JP] Japan .................. 59-183775

[51] Int. Cl.$^4$ ............................................. B29H 5/02
[52] U.S. Cl. ...................................................... 425/38
[58] Field of Search .......................................... 425/38

[56] References Cited

U.S. PATENT DOCUMENTS

| 3,378,882 | 4/1968 | Turk et al. | 425/38 |
| 3,597,797 | 8/1971 | Delille | 425/38 X |
| 3,640,653 | 2/1972 | Laenen et al. | 425/38 X |
| 3,846,058 | 11/1974 | Yoshida et al. | 425/38 |
| 3,988,077 | 10/1976 | Naratov et al. | 425/38 X |
| 4,025,251 | 5/1977 | Cantarutti | 425/38 X |
| 4,068,989 | 1/1978 | Cantarutti | 425/38 |
| 4,449,903 | 5/1984 | Hasegawa et al. | 425/38 |

Primary Examiner—J. Howard Flint, Jr.
Attorney, Agent, or Firm—Wenderoth, Lind & Ponack

[57] ABSTRACT

An unloader for a tire curing machine is improved in that a tire gripping device in the unloader is composed of a chuck base for depressing an upper bladder clamp ring upon lowering an arm which supports the tire gripping device to form a space for inserting chuck claws between inner circumferential portions of a bladder and a cured tire, chuck claws mounted on the chuck base so as to be expansible and contractible, and a chuck claw expansion/contraction hydraulic cylinder mounted on the chuck base.

1 Claim, 4 Drawing Figures

UNLOADER FOR A TIRE CURING MACHINE

BACKGROUND OF THE INVENTION

1. Field of the Invention

The present invention relates to an unloader for a tire curing machine, which transports a cured tire after having been cured in a tire curing machine from the tire curing machine to a post-cure inflator for air-cooling the tire.

2. Description of the Prior Art

In a heretofore known unloader for a tire curing machine, a cured tire is made to fall from a high position, then it is made to move on rollers of an inclined conveyor by the weight of the tire, and it is made to stop at a center position of a post-cure inflator (hereinafter abbreviated as PCI) by making it butt against a stopper provided in the PCI. Thereafter, the tire is gripped by the PCI to carry out the inflation work. However, the above-mentioned unloader in the prior art had a disadvantage that the centering of the tire with respect to the PCI could not always be done with good precision.

Therefore, previously the inventors of this invention proposed an unloader for a tire curing machine of the type that a vertical rotary shaft is disposed between the tire curing machine and a post-cure inflator and connected to a main body of the tire curing machine, an arm is mounted on the rotary shaft so as to be movable vertically along the rotary shaft and swingable about the axis of the rotary shaft between a center position of a metal mold of the tire curing machine and a center position of a post-cure inflator ring of the post-cure inflator, and a tire gripping device having expansible and contractible chuck claws for gripping a bead portion of a cured tire is mounted at the tip end portion of the arm.

In the last-mentioned unloader for a tire curing machine, the inner circumferential portion of the cured tire is gripped by moving the chuck claws in the outward directions along guide slots provided in a chuck main body with the aid of an expansion or contraction effect of a hydraulic cylinder. However, at this moment, since the inner circumferential portion of the cured tire is in tight contact with an inner circumferential surface of a bladder, it was difficult to smoothly insert the chuck claws between the cured tire and the bladder without damaging either one of them.

SUMMARY OF THE INVENTION

It is therefore one object of the present invention to provide an improved unloader for a tire curing machine in which chuck claws in a tire gripping device can be smoothly inserted between a cured tire and a bladder without damaging either one of them and thereby a working efficiency can be enhanced.

According to one feature of the present invention, there is provided an unloader for a tire curing machine of the type that a rotary shaft is disposed between the tire curing machine and a post-cure inflator and connected to a main body of the tire curing machine, an arm is mounted on the rotary shaft so as to be movable vertically along the rotary shaft and swingable about the axis of the rotary shaft between a center position of a metal mold of the tire curing machine and a center position of a post-cure inflator ring of the post-cure inflator, and a tire gripping device having expansible and contractible chuck claws for gripping a bead portion of a cured tire is mounted at the tip end portion of the arm, in which the tire gripping device comprises a chuck base for depressing an upper bladder clamp ring upon lowering the arm to form a space portion for inserting the chuck claws between the inner circumferential portions of the bladder and the cured tire, chuck claws mounted on the chuck base so as to be expansible and contractible, and a chuck claw expansion/contraction hydraulic cylinder mounted on the chuck base.

The above-mentioned and other features and objects of the present invention will become more apparent by reference to the following detailed description taken in conjunction with the accompanying drawings.

DETAILED DESCRIPTION OF THE PRIOR ART

Figure 2:
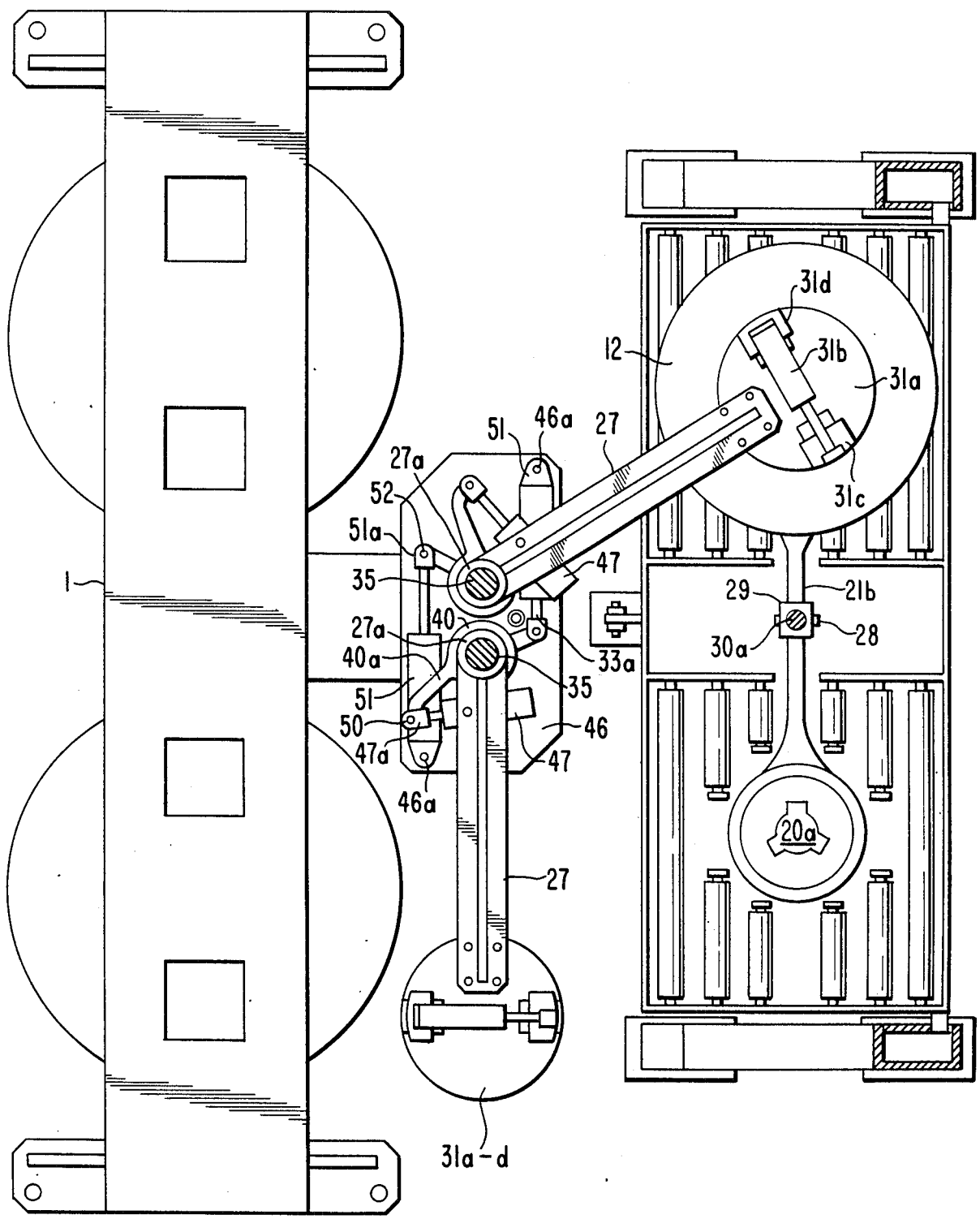
FIG. 2 is a plan view of a prior art unloader for a tire curing machine which has been already proposed by the inventors of the present invention.
Figure 3:
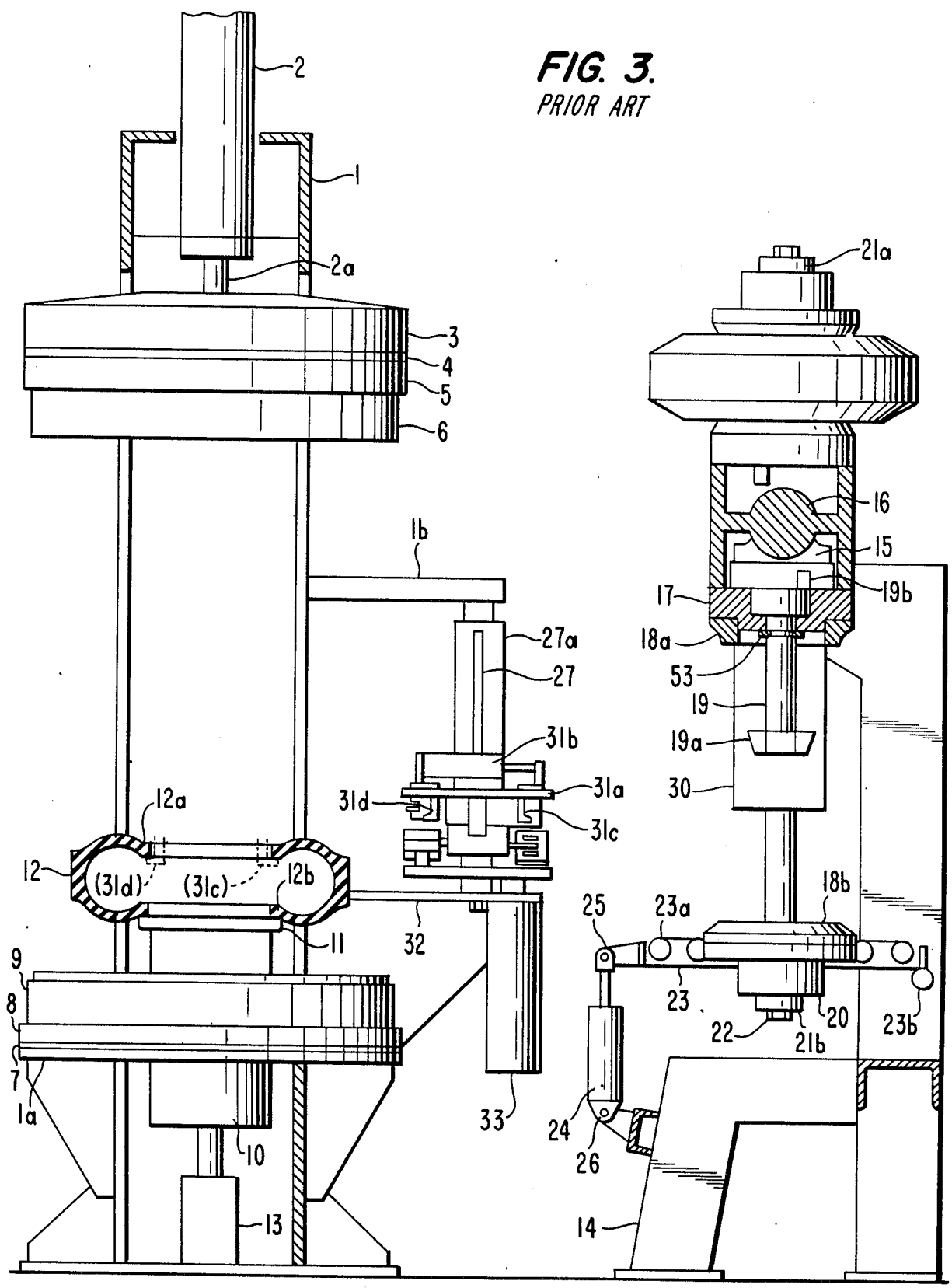
FIG. 3 is a side view partly in cross-section of the same prior art unloader.
Figure 4:
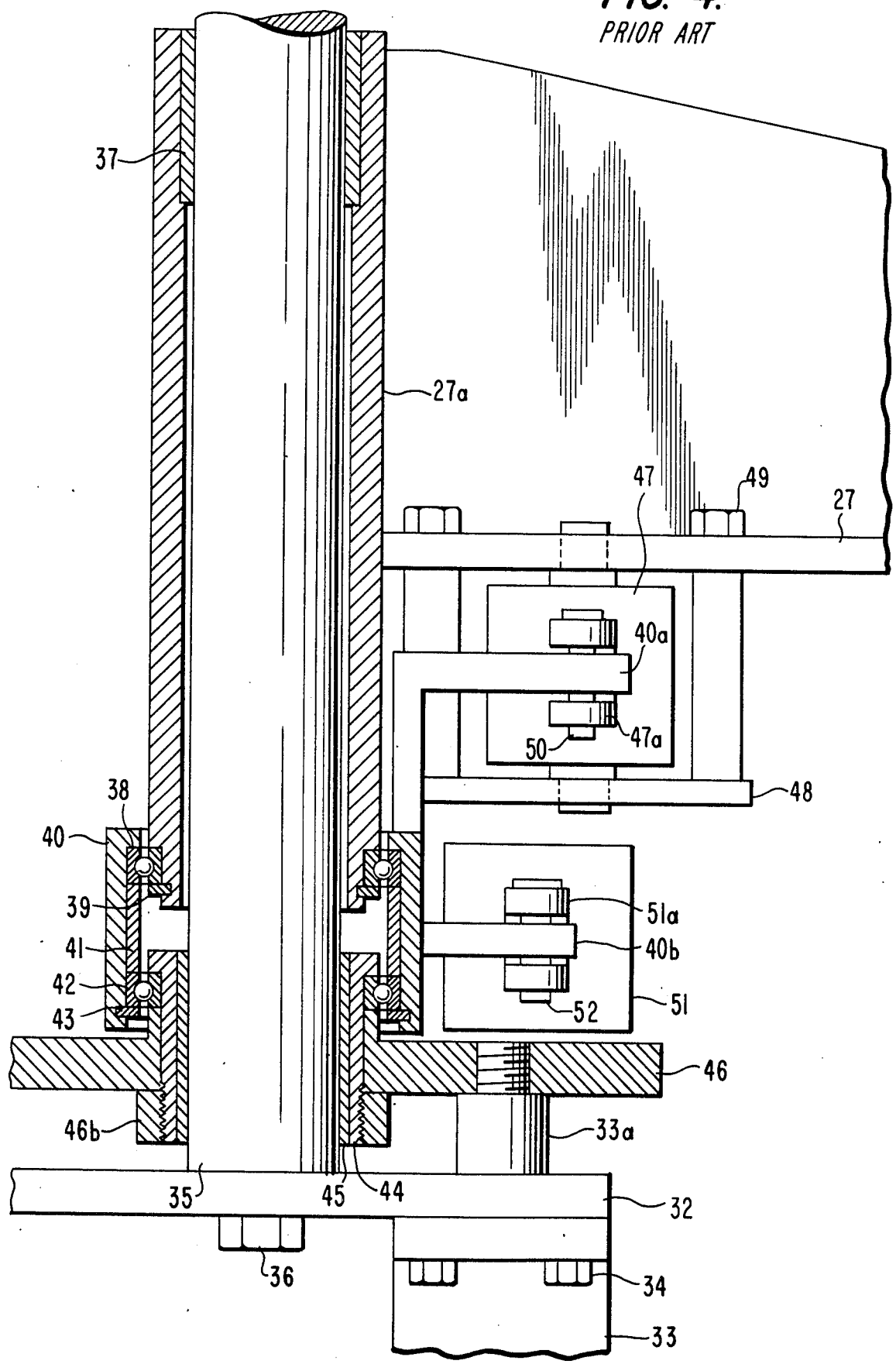
FIG. 4 is a side view partly in cross-section showing a part of the same prior art unloader in an enlarged scale.

Before entering upon a detailed description of the present invention, the above-referenced prior art unloader for a tire curing machine which was previously proposed by the inventors of the present invention, will be described in more detail with reference to FIGS. 2, 3 and 4. In FIG. 3, a tip end of a rod (2a) of a pressing hydraulic cylinder (2) mounted in an upper portion of a tire curing machine main body (1) is fixed by a screw connection to a bolster (3), to which an upper heat-insulating plate (4), an upper heater plate (5) and an upper metal mold (6) are fixed by bolts. The upper metal mold (6) is raised and lowered by the rod (2a) of the hydraulic cylinder (2) being moved up and down by hydraulic pressure. Also, on an upper surface of a circular plate (1a) provided in a lower portion of the tire curing machine main body (1), there are fixed by bolts a lower heat-insulating plate (7), a lower heater plate (8) and a lower metal mold (9). In addition, in the central portion of the lower heat-insulating plate (7), the lower heater plate (8) and the lower metal mold (9), there is formed a cylindrical bore, and a bead lifter (10) is loosely fitted in the bore. The bead lifter (10) and a lower bead ring (11) are fixed to each other by means of a bayonet mechanism. A cured tire (12) can be raised and lowered via a hydraulic cylinder (13), the bead lifter (10) and the lower bead ring (11). A rotary shaft (16) is inserted in a bearing (15) fixed on a top surface of a PCI frame (14), and this rotary shaft (16) can be rotated by 180° by means of a rotating mechanism not shown. A disc (17) is fixed to the rotary shaft (16) by means of bolts or the like. On the lower surface of the disc (17), there is fixed an upper PCI ring (18a) by means of bolts or the like, and at the central portion of the disc (17), there is rotatably mounted a bayonet (19) by means of a snap ring (53). The tip end (19a) of the bayonet (19) has the so-called bayonet shape, and at the top end of the bayonet (19), there is provided a pin (19b) for rotating the same. A bayonet ring (20) is provided on its inner surface with a bayonet portion (20a) (see FIG. 2) which is adapted to the tip end (19a) of the bayonet (19). On the upper side surface of the bayonet ring (20), there is fixed a lower PCI ring (18b) by means of bolts or the like, and on the lower surface side thereof, there is fixed a link (21b) by a bolt (22). Roller conveyor (23) includes a plurality of rollers (23a), and it is adapted to be inclined by a necessary angle about a pin (23b) in response to upward movement of a hydraulic cylinder (24). Pins (25) and (26) pivotably support the upper and lower end portions of the hydraulic cylinder (24). A link (21b) connects the left and right bayonet rings (20) with each other. As shown in FIG. 2, a clevis (29) is connected to the center of the link (21b) by means of a pin (28). A cross-section of a rod (30a) of a hydraulic cylinder (30) is connected to the clevis (29). As shown in FIG. 3, a head side of the hydraulic cylinder (30) is connected to a link (21a) on the upper side by means of a pin. At the tip end of an arm (27), there is fixed a chuck main body (31a) by means of bolts or the like. A claw (31c) and another claw (31d) are adapted to be moved in the outward or inward directions along guide slots provided in the chuck main body (31a) by an expansion/contraction effect of a hydraulic cylinder (31b) so that the cured tire (12) may be gripped or released at the inner surface of its upper bead. In addition, a bracket (32) is fixedly secured to the tire curing machine main body (1) by means of bolts or the like. As shown in FIG. 4, on the upper surface of the bracket (32), there are fixedly secured two guide rods (35) by means of bolts (36). The top ends of the guide rods (35) are gripped, as shown in FIG. 3, by a support (1b) which is also fixedly secured to the tire curing machine main body (1). As shown in FIG. 4, one end of the arm (27) is formed on a cylinder (27a), a bush (37) is snugly fitted to the top end of the inner surface of the cylinder (27a), and the inner surface of the bush (37) is loosely fitted around the guide rod (35). The lower end of the cylinder (27a) is snugly fitted in an inner ring of an upper ball bearing (38) and is fixed thereto by means of a snap ring (39). On the other hand, an upper portion of an inner surface of an outer cylinder (40) is snugly fitted around an outer ring of the upper ball bearing (38), a spacer (41) is inserted under the outer ring, and further, an outer ring of a lower ball bearing (42) is snugly fitted in the outer cylinder (40) under the spacer (41) and fixedly secured thereto by means of a snap ring (43). Another cylinder (44) has a bush (45) snugly fitted to its inner surface, and the inner surface of the bush (45) is loosely fitted around the guide rod (35). A thread is formed on the outer surface of the lower end portion of the cylinder (44), and an inner ring of a ball bearing (42) and a common base plate (46) are fixed to this cylinder (44) by a nut (47b) engaged with the threaded end of the cylinder (44). A hydraulic cylinder (47) is swingably held on the lower surface of the arm (27) by means of a cylinder support (48) and bolts (49), and a clevis (47a) at the tip end of the rod of the same hydraulic cylinder (47) is connected via a pin (50) with an arm (40a) that is integral with the outer cylinder (40). In addition, as shown in FIG. 2, a rear end of a hydraulic cylinder (51) is connected with a pin (46a) that is integral with the common base plate (46). Returning to FIG. 4, and a clevis (51a) at the tip end of the rod of the same hydraulic cylinder (51) is connected via a pin (52) with an arm (40b) that is integral with the outer cylinder (40). A tip end (33a) of a rod of a hydraulic cylinder (33) is fixed to the common base plate (46) by a screw connection.

In the above-described unloader for a tire curing machine, when curing has been completed, as shown in FIG. 3, the pressing hydraulic cylinder (2) is moved upwards by a hydraulic pressure control device not shown, and is stopped at the upper limit position. The hydraulic cylinder (13) is likewise moved upwards, and hence the cured tire (12) is separated from the lower metal mold (9) by the lower bead ring (11) and stands by at a predetermined level. As shown in FIG. 2, a chuck assembly (31a)–(31d) in a standby state is transferred to a center position above the cured tire (12) by a contraction or expansion action of the hydraulic cylinder (51). Subsequently, after the hydraulic cylinder (33) of FIG. 3 has been moved downwards and the common base plate (46) of FIG. 2 has been lowered, the hydraulic cylinder (31b) expands to open the claws (31c) and (31d), and thereby the upper bead portion (12a) of the cured tire (12) is gripped by the claws (31a) and (31d) as shown by dotted lines in FIG. 3. After the hydraulic cylinder (33) has been raised up to the upper limit position, the hydraulic cylinder (47) of FIG. 2 expands and simultaneously therewith the hydraulic cylinder (51) contracts or expands. Then the chuck assembly (31a)–(31d) is moved to a center position above the lower PCI ring (18b) shown in FIG. 3. Subsequently, the hydraulic cylinder (33) is moved downwards, hence the lower bead portion (12b) of the cured tire (12) is inserted into the lower PCI ring (18b), and then the chuck assembly (31a)–(31d) is transferred to its standby position by carrying out an operation opposite to that described above. Next, the hydraulic cylinder (30) contracts, hence the bead portion (12a) of the cured tire (12) is brought into tight contact with the upper PCI ring (18a), and then the pin (19b) provided on the top of the bayonet (19) is revolved by a hydraulic cylinder. Thereby, the cured tire (12) is clamped by the tip end (19a) of the bayonet (19) and the bayonet mechanism of the bayonet portion (20a) (see FIG. 2), and is inflated by compressed air that is introduced through an internal gas passageway. After a predetermined period has elapsed, the rotary shaft (16) is rotated by 180° by a rotating mechanism not shown, an operation opposite to that described above is carried out, and thereby the cured tire (12) is released. When the hydraulic cylinder (24) is moved upwards, the roller conveyor (23) is swung about the center of rotation at the pin (23b) to be inclined at a predetermined angle. Thereby the cured tire (12) is raised from the lower PCI ring (18b), then it is conveyed on the rollers (23a) by the component force of its own weight, and thus one cycle of operation is finished.

In the unloader for a tire curing machine illustrated in FIGS. 2 to 4 and described above, the inner circumferential portion of the cured tire (12) is gripped by moving chuck claws (31c) and (31d) in the outward directions along guide slots provided in the chuck main body (31a) by an expansion and contraction effect of the hydraulic cylinder (31b). However, at this moment, since the inner circumferential portion of the cured tire (12) is in tight contact with the inner circumferential surface of the bladder, it was difficult to smoothly insert the chuck claws (31c) and (31d) between the cured tire (12) and the bladder without damaging either one of them.

DESCRIPTION OF A PREFERRED EMBODIMENT

Figure 1:
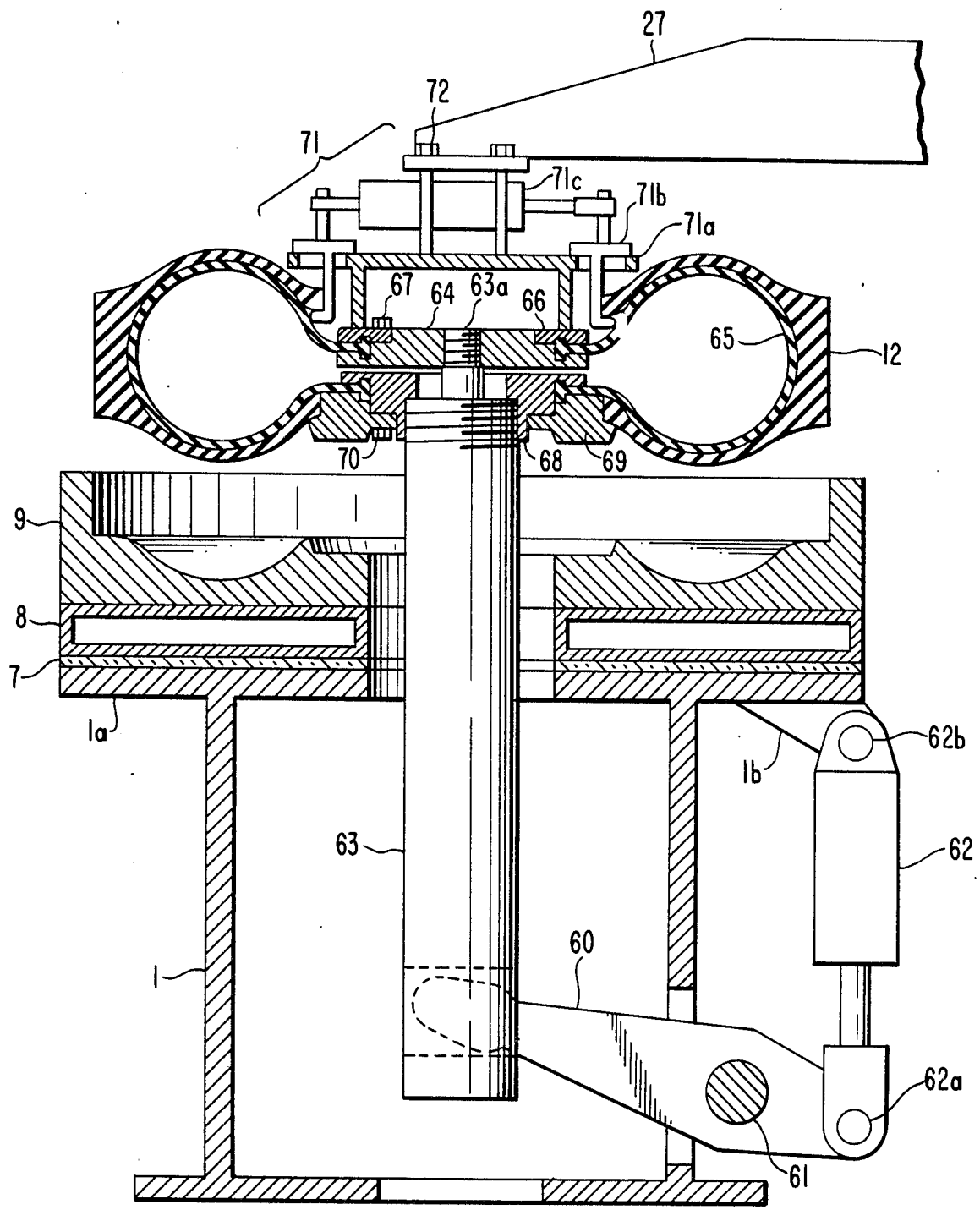
FIG. 1 is a longitudinal cross-section side view showing one preferred embodiment of an unloader for a tire curing machine according to the present invention.

Now the unloader for a tire curing machine according with the present invention will be described in connection to one preferred embodiment illustrated in FIG. 1. Onto the top surface of a circular plate (1a) provided at the lower portion of a tire curing machine main body (1), there are fixedly secured a lower heat-insulating plate (7) and a lower heater plate (8) by means of bolts or the like, and a lower metal mold (9) is fixed to the lower heater plate (8) by means of bolts or the like. In addition, a lever (60), which is loosely fitted around the pin (61), and the pin (61) is fixedly secured to a tire curing machine main body (1). In a hole at the right end of the lever (60), there is loosely fitted a pin (62a) of a lower end clevis of a hydraulic cylinder (62), and a pin (62b) of an upper end clevis of the hydraulic cylinder (62) is loosely fitted in a hole formed in a rib (1b) provided on the tire curing machine main body (1). The left end of the above-mentioned lever (60) is slidably inserted in a rectangular hole formed in a lower portion of a center post (63). This center post (63) is a cylinder that can be moved vertically by hydraulic pressure, and a top end (63a) of a piston rod thereof is threadedly connected with an upper bladder clamp ring (64). This upper bladder clamp ring (64) fixedly clamps the inside upper edge of a bladder (65) in cooperation with an upper bladder fastener (66) and bolts (67). A top portion of an outer cylinder of the center post (63) is threaded, and a lower bladder clamp ring (68) is threadedly engaged with this top portion. This lower bladder clamp ring (68) fixedly clamps the inside lower edge of the bladder (65) in cooperation with a lower bladder fastener (69) and bolts (70). An unloader arm (27) for a cured tire (12) supports a chuck (71) by suspending it via bolts (72). The chuck (71) is composed of a disc-shaped chuck base (71a), chuck claws (71b) and a hydraulic cylinder (71c). The chuck base (71a) has two elongated holes for slidably supporting the chuck claws (71b). At the lower portions of the two chuck claws (71b), there are respectively provided arcuated claws which are adapted to the inner surface of the cured tire (12). Above the arcuated claws, there are formed rods which are loosely fitted to clevises of the hydraulic cylinder (71c), and these rods are inserted into clevis holes at the opposite ends of the hydraulic cylinder (71c). The lower end portions of the chuck claws (71b) are shortened so as to be located a little above the lower end surface of the chuck base (71a), and thereby a gap clearance can be formed between the upper bladder fastener (66) and the chuck claws (71b).

Now description will be made on the operation of the unloader for a tire curing machine illustrated in FIG. 1. FIG. 1 shows the state of the unloader where, after completion of curing, the hydraulic cylinder (62) was expanded by a hydraulic pressure generating device not shown. Hence, the center post (63) was mechanically moved upwards via the lever (60) to separate the cured tire (12) from the lower metal mold (9). The unloader arm (27) was moved downwards by an elevator device not shown (at this moment the chuck claws (71b) had been contracted). The chuck base (71a) was butted against the upper bladder clamp ring (64) so as to depress the upper bladder clamp ring (64) and to form a space portion for inserting the chuck claws between the inner circumferential portions of the cured tire (12) and the bladder (65). Subsequently the hydraulic cylinder (71c) was expanded to make the lower end portions of the chuck claws (71b) butt against the inner circumferential portion of the cured tire (12), and thereby the cured tire (12) has been gripped. Starting from the state shown in FIG. 1, if the unloader arm (27) is raised and at the same time the center post (63) is depressurized by a hydraulic pressure generating device not shown, then the bladder (65) is deflated and pealed from the inner surface of the cured tire (12) and is deformed into a cylindrical shape so that the cured tire (12) can be transferred to the PCI. Thereafter, when the center post (63) is moved downward by the lower (60), the lower bladder fastener (69) is brought into tight contact with the tapered portion and the flat portion of the lower metal mold (9). Then, the tire curing machine becomes ready to receive the next green tire for curing. It is to be noted that the above-described operation is also possible even before extraction of the tire or during extraction of the tire.

According to the present invention, as described in detail above, in an unloader for a tire curing machine of the type that a rotary shaft is disposed between the tire curing machine and a post-cure inflator and connected to a main body of the tire curing machine, an arm is mounted on the rotary shaft so as to be movable vertically along the rotary shaft and swingable about the axis of the rotary shaft between a center position of a metal mold of the tire curing machine and a center position of a post-cure inflator ring of the post-cure inflator. A tire gripping device having expansible and contractible chuck claws for gripping a bead portion of a cured tire is mounted at the tip end portion of the arm. Since the tire gripping device is composed of a chuck base for depressing an upper bladder clamp ring upon lowering the arm to form a space portion for inserting the chuck claws between the inner circumferential portions of the bladder and the cured tire, chuck claws mounted on the chuck base so as to be expansible and contractible, and a chuck claw expansion/contraction hydraulic cylinder mounted on the chuck base, it is possible to form a space for inserting the chuck claws between the inner circumferential portions of the cured tire and the bladder by making the chuck base butt against the upper bladder clamp ring to depress the upper bladder clamp ring. Therefore, the chuck claws of the gripping device can be smoothly inserted between the inner circumferential portions of the cured tire and the bladder without damaging either one of them. Thus, the present invention provides the advantage that a working efficiency of an unloader for a tire curing machine can be enhanced.

While the present invention has been described above in connection with one preferred embodiment thereof, as a matter of course, it is intended that the present invention should not be limited to the illustrated embodiment but various changes and modifications in design could be made without departing from the spirit of the present invention.

What is claimed is:

1. An unloader for handling a cured tire in a tire curing machine of the type that a guide rod is disposed between the tire curing machine and a post-cure inflator and is connected to a main body of said tire curing machine, an arm is mounted on said guide rod so as to be movable vertically along said guide rod and swingable about the axis of said guide between a center post of a metal mold of said tire curing machine and a bayonet portion of a post-cure inflator ring of said post-cure inflator, a bladder removably arranged inside the cured tire, and a tire gripping device is mounted at the tip end portion of said arm; characterized in that the tire gripping device comprises:
- a chuck base means secured to said arm for depressing an upper bladder clamp ring upon lowering said arm to form a space between inner circumferential portions of the bladder and the cured tire,
- a hydraulic cylinder means, mounted on said chuck base means, for expanding and contracting the chuck claws, and
- a lever means, connected to the center post of the metal mold, for mechanically raising said center post so that the cured tire is separated from the metal mold and also for mechanically lowering said center post while the arm is simultaneously raised so that the bladder is removed from inside the cured tire, whereby the bladder and the cured tire are separated from each other without damaging either one of them, and further whereby said bladder and said cured tire are so separated solely by raising and lowering the arm and the center post without providing an additional driving mechanism.

* * * * *